(12) United States Patent
Poisner

(10) Patent No.: US 7,076,802 B2
(45) Date of Patent: Jul. 11, 2006

(54) TRUSTED SYSTEM CLOCK

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 10/334,954

(22) Filed: Dec. 31, 2002

(65) Prior Publication Data

US 2004/0128549 A1 Jul. 1, 2004

(51) Int. Cl.
*G06F 1/00* (2006.01)

(52) U.S. Cl. .................................... 726/22; 713/500

(58) Field of Classification Search ........ 713/200–202, 713/189, 500–601; 707/203; 726/22
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,162,536 A | 7/1979 | Morley |
| 4,207,609 A | 6/1980 | Luiz et al. |
| 4,276,594 A | 6/1981 | Morley |
| 4,307,447 A | 12/1981 | Provanzano et al. |
| 4,319,233 A | 3/1982 | Matsuoka et al. |
| 4,319,323 A | 3/1982 | Ermolovich et al. |
| 4,403,283 A | 9/1983 | Myntti et al. |
| 4,419,724 A | 12/1983 | Branigin et al. |
| 4,430,709 A | 2/1984 | Schleupen et al. |
| 4,759,064 A | 7/1988 | Chaum |
| 4,795,893 A | 1/1989 | Ugon |
| 4,802,084 A | 1/1989 | Ikegaya et al. |
| 4,975,836 A | 12/1990 | Hirosawa et al. |
| 5,001,752 A | 3/1991 | Fischer |
| 5,007,082 A | 4/1991 | Cummins |
| 5,187,802 A | 2/1993 | Inoue et al. |
| 5,230,069 A | 7/1993 | Brelsford et al. |
| 5,237,616 A | 8/1993 | Abraham et al. |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,459,867 A | 10/1995 | Adams et al. |
| 5,459,869 A | 10/1995 | Spilo |
| 5,469,557 A | 11/1995 | Salt et al. |
| 5,489,095 A | 2/1996 | Goudard et al. |

(Continued)

FOREIGN PATENT DOCUMENTS

DE 4217444 12/1992

(Continued)

OTHER PUBLICATIONS

Brands, Stefan , "Restrictive Blinding of Secret-Key Certificates", *Springer-Verlag XP002201306,* (1995),Chapter 3.

(Continued)

*Primary Examiner*—Emmanuel L. Moise
*Assistant Examiner*—Jeffrey Popham
(74) *Attorney, Agent, or Firm*—Jeffrey B. Huter

(57) ABSTRACT

Methods, apparatus and computer readable medium are described that attempt increase trust in a system time provided by a system clock. In some embodiments, a detector detects activities that may be associated with attacks against the system clock. Based upon whether the detector detects a possible attack against the system clock, the computing device may determine whether or not to trust the system time provided by the system clock.

37 Claims, 4 Drawing Sheets

U.S. PATENT DOCUMENTS

| | | |
|---|---|---|
| 5,500,897 A | 3/1996 | Hartman, Jr. |
| 5,504,922 A | 4/1996 | Seki et al. |
| 5,506,975 A | 4/1996 | Onodera |
| 5,533,123 A * | 7/1996 | Force et al. ............... 713/189 |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,633,929 A | 5/1997 | Kaliski, Jr. |
| 5,668,971 A | 9/1997 | Neufeld |
| 5,684,948 A | 11/1997 | Johnson et al. |
| 5,706,469 A | 1/1998 | Kobayashi |
| 5,740,178 A | 4/1998 | Jacks et al. |
| 5,752,046 A | 5/1998 | Oprescu et al. |
| 5,805,870 A * | 9/1998 | Browning ................ 709/400 |
| 5,809,546 A | 9/1998 | Greenstein et al. |
| 5,825,880 A | 10/1998 | Sudia et al. |
| 5,901,225 A | 5/1999 | Ireton et al. |
| 5,919,257 A | 7/1999 | Trostle |
| 5,935,242 A | 8/1999 | Madany et al. |
| 5,935,247 A | 8/1999 | Pai et al. |
| 5,956,408 A | 9/1999 | Arnold |
| 5,970,147 A | 10/1999 | Davis et al. |
| 5,978,475 A | 11/1999 | Schneier et al. |
| 6,035,374 A | 3/2000 | Panwar et al. |
| 6,044,478 A | 3/2000 | Green |
| 6,061,794 A | 5/2000 | Angelo |
| 6,088,262 A | 7/2000 | Nasu |
| 6,092,095 A | 7/2000 | Maytal |
| 6,093,213 A | 7/2000 | Favor et al. |
| 6,108,644 A | 8/2000 | Goldschlag et al. |
| 6,115,816 A | 9/2000 | Davis |
| 6,131,166 A | 10/2000 | Wong-Insley |
| 6,173,417 B1 | 1/2001 | Merrill |
| 6,175,924 B1 | 1/2001 | Arnold |
| 6,188,257 B1 | 2/2001 | Buer |
| 6,199,152 B1 | 3/2001 | Kelly et al. |
| 6,212,635 B1 | 4/2001 | Reardon |
| 6,222,923 B1 | 4/2001 | Schwenk |
| 6,252,650 B1 | 6/2001 | Nakamura |
| 6,269,392 B1 | 7/2001 | Cotichini et al. |
| 6,275,933 B1 | 8/2001 | Fine et al. |
| 6,282,650 B1 | 8/2001 | Davis |
| 6,327,652 B1 | 12/2001 | England et al. |
| 6,330,670 B1 | 12/2001 | England et al. |
| 6,357,004 B1 | 3/2002 | Davis |
| 6,363,485 B1 | 3/2002 | Adams |
| 6,374,286 B1 | 4/2002 | Gee et al. |
| 6,378,068 B1 | 4/2002 | Foster |
| 6,378,072 B1 | 4/2002 | Collins et al. |
| 6,389,537 B1 | 5/2002 | Davis et al. |
| 6,393,126 B1 | 5/2002 | van der Kaay et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,445,797 B1 | 9/2002 | McGough et al. |
| 6,446,092 B1 * | 9/2002 | Sutter ..................... 707/203 |
| 6,463,535 B1 | 10/2002 | Drews et al. |
| 6,463,537 B1 | 10/2002 | Tello |
| 6,507,904 B1 | 1/2003 | Ellison et al. |
| 6,529,909 B1 | 3/2003 | Bowman-Amuah |
| 6,535,988 B1 | 3/2003 | Poisner |
| 6,553,496 B1 * | 4/2003 | Buer ..................... 713/200 |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0027511 A1 | 10/2001 | Wakabayashi et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0473913 | 3/1992 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1030237 A | 8/2000 |
| EP | 1055989 | 11/2000 |
| EP | 1056014 | 11/2000 |
| EP | 1085396 | 3/2001 |
| EP | 1146715 | 10/2001 |
| EP | 1 229 424 A2 | 8/2002 |
| EP | 1229424 A2 | 8/2002 |
| EP | 1271277 | 1/2003 |
| JP | 02000076139 A | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO99/65579 | 12/1999 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO 01/27595 | 10/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn, et al., "Replacement Strategy for Aging Avionics Computers", *IEEE AES Systems Magazine*, XP002190614,(Mar. 1999).

Menezes, Oorschot, "Handbook of Applied Cryptography", *CRC Press LLC*, USA XP002201307, (1997),475.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering*, University of California, San Diego, La Jolla, CA, (Nov. 2001).

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Heinrich, J., "MIPS R4000 Microprocessor User's Manual," Apr. 1, 1993, MIPS, Mt. View, XP002184449, pp. 61-97.

Heinrich, J.:"MIPS R4000 Microprocessor User's Manual", 1994, MIPS Technology Inc., Mountain View, CA, pp. 67-79.

"M68040 User's Manual," 1993, Motorola, Inc., pp. 1-20.

"Intel 386 DX Microprocessor 32-Bit CHMOS Microprocessor With Integrated Memory Management," Dec. 31, 1995, Intel, Inc., pp. 32-56; figures 4-14.

Berg, C., "How Do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: an Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986),155-160.

Fabry, R.S., "Capability-Based Addressing", Fabry, R.S., "Capability-Based Addressing," *Communications of the ACM*, vol. 17, No. 7 (Jul. 1974),403-412.

Frieder, Gideon, "The Architecture And Operational Characteristics of the VMX Host Machine", The Architecture And Operational Characteristics of the VMX Host Machine, *IEEE*, (1982),9-16.

HP Mobile Security Overview, "HP Mobile Security Overview", (Sep. 2002),1-10.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: IA-64 System Architecture, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", VM/4: ACOS-4 Virtual Machine Architecture, *IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithm, and Source Code in C", *Wiley, John & Sons, Inc.*, XP0021111449; ISBN 0471117099,(Oct. 1995),169-187.

Schneier, Bruce, "Applied Cryptography: Protocols, Algorithms, and Source Code C", *Wiley, John & Sons, Inc.*, XP002251738; ISBN 0471128457,(Nov. 1995),28-33; 176-177; 216-217; 461-473; 518-522.

Looi M.H. et al., "A Note On Supplying A Strusted Clock Via A Secure Device", Computers & Security, Elsevier Science Publishers., vol. 13, No. 7, pp. 611-613, Amsterdam.

India National Phase Application No.: 2750/DELNP/2005 Examination Report dated Jan. 10, 2006;.

* cited by examiner

TRUSTED SYSTEM CLOCK

BACKGROUND

An operating system may include a system clock to provide a system time for measuring small increments of time (e.g. 1 millisecond increments). The system clock may update the system clock in response to a periodic interrupt generated by a system timer such as an Intel 8254 event timer, an Intel High Performance Event Timer (HPET), or a real time clock event timer. The operating system may use the system time to time-stamp files, to generate periodic interrupts, to generate time-based one-shot interrupts, to schedule processes, etc. Generally, the system clock may keep a system time while a computing device is operating, but typically is unable to keep a system time once the computing device is powered off or placed in a sleep state. The operating system therefore may use a reference clock to initialize the system time of the system clock at system start-up and at system wake-up. Further, the system clock tends to drift away from the correct time. Accordingly, the operating system may use a reference clock to periodically update the system time of the system clock.

One such reference clock is a hardware real time clock (RTC). A computing device typically includes an RTC and a battery to power the RTC when the computing device is powered down. Due to the battery power, the RTC is able to maintain a real time or a wall time even when the computing device is powered off or placed in a sleep state, and generally is capable of keeping time more accurately than the system clock. Besides providing an interface for obtaining the wall time, the RTC further provides an interface such as, for example, one or more registers which may be used to set or change the time of the RTC. As is known by those skilled in the art, wall time refers to actual real time (e.g. 12:01 PM, Friday, Dec. 4, 2002) which may comprising, for example, the current seconds, minutes, hours, day of the week, day of the month, month, and year. Wall time derives its name from the time provided by a conventional clock that hangs on a wall and is commonly used to differentiate from CPU time which represents the number of seconds a processor spent executing a process. Due to multi-tasking and multi-processor systems, the CPU time to executed a process may vary drastically from the wall time to execute the process.

The computing device may use the system clock and/or the RTC clock to enforce policies for time-sensitive data. In particular, the computing device may provide time-based access restrictions upon data. For example, the computing device may prevent reading an email message after a period of time (e.g. a month) has elapsed from transmission. The computing device may also prevent reading of source code maintained in escrow until a particular date has arrived. As yet another example, the computing device may prevent assigning a date and/or time to a financial transaction that is earlier than the current date and/or time. However, for these time-based access restrictions to be effective, the computing device must trust the system clock is resistant to attacks that may alter the system time to the advantage of an attacker.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

The following description describes techniques for protecting system time of a system clock from being changed in order to gain unauthorized access to time-sensitive data and/or to perform unauthorized time-sensitive operations. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
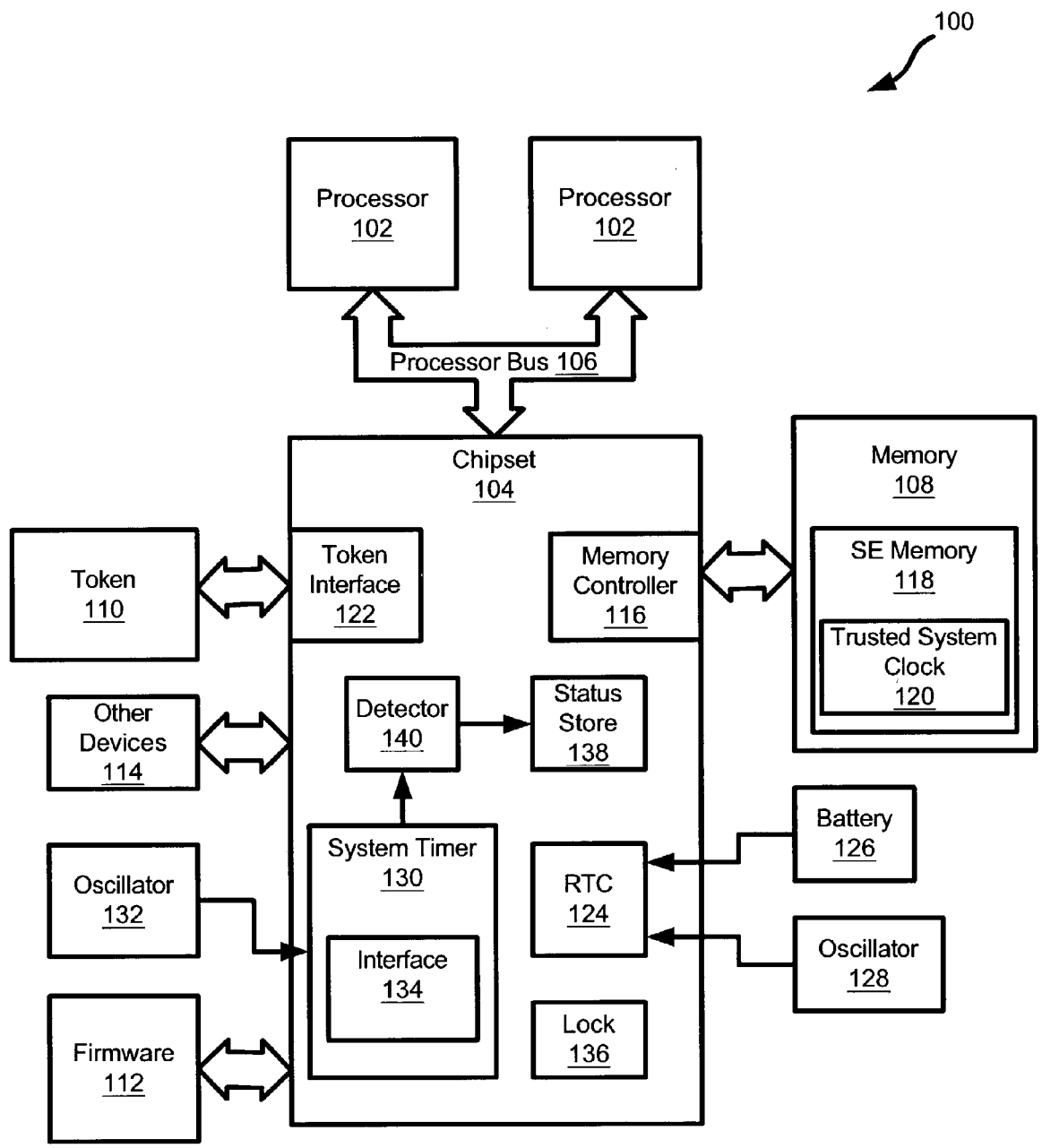
FIG. 1 illustrates an embodiment of a computing device.

An example embodiment of a computing device 100 is shown in FIG. 1. The computing device 100 may comprise one or more processors 102 coupled to a chipset 104 via a processor bus 106. The chipset 104 may comprise one or more integrated circuit packages or chips that couple the processors 102 to system memory 108, a token 110, firmware 112 and/or other I/O devices 114 of the computing device 100 (e.g. a mouse, keyboard, disk drive, video controller, etc.).

Figure 3:
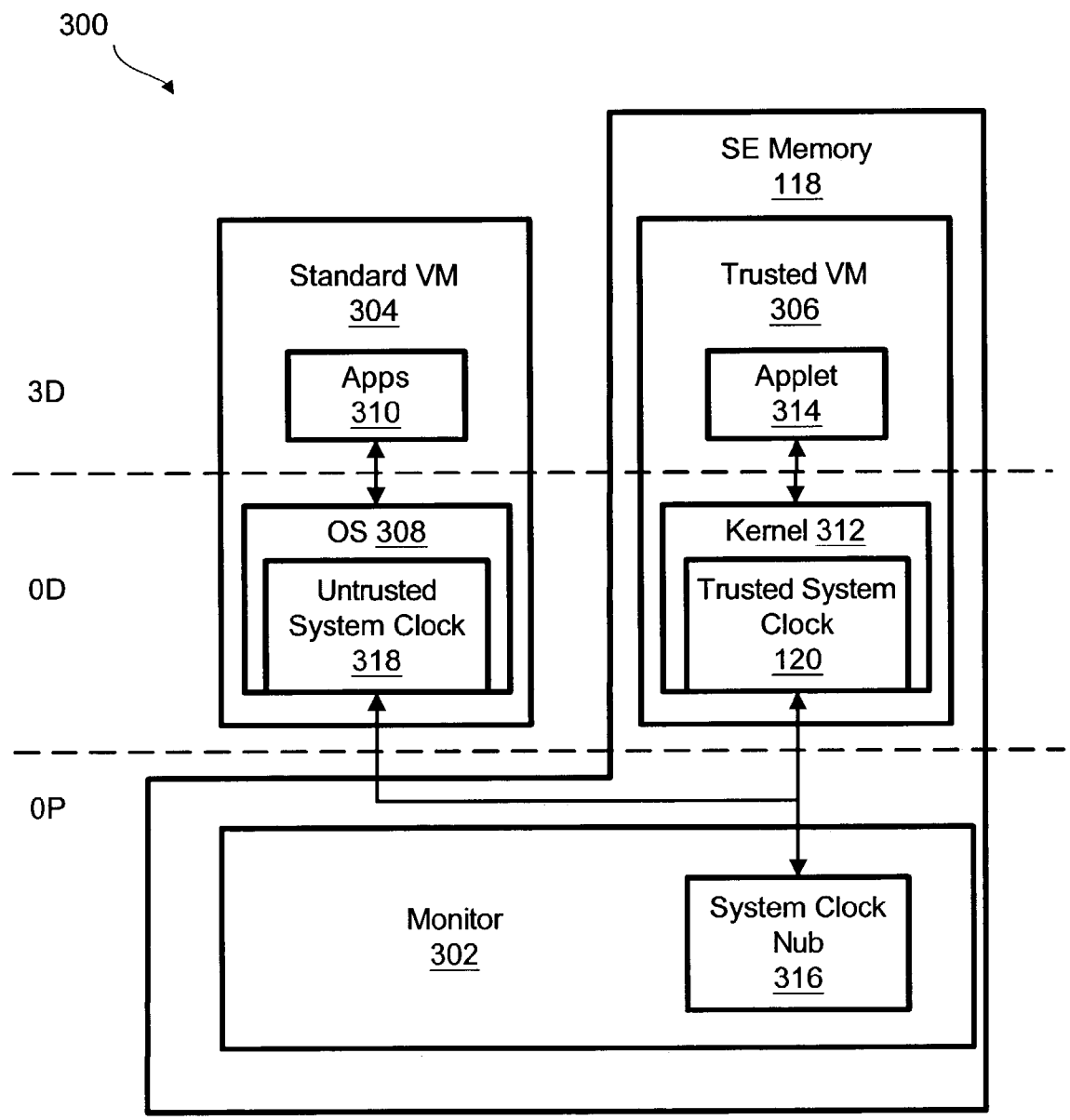
FIG. 3 illustrates an embodiment of a security enhanced (SE) environment that may be established by the computing device of FIG. 1.

The processors 102 may support execution of a secure enter (SENTER) instruction to initiate creation of a security enhanced (SE) environment such as, for example, the example SE environment of FIG. 3. The processors 102 may further support a secure exit (SEXIT) instruction to initiate dismantling of a SE environment. In one embodiment, the processor 102 may issue bus messages on processor bus 106 in association with execution of the SENTER, SEXIT, and other instructions. In other embodiments, the processors 102 may further comprise a memory controller (not shown) to access system memory 108.

The processors 102 may further support one or more operating modes such as, for example, a real mode, a protected mode, a virtual real mode, and a virtual machine extension mode (VMX mode). Further, the processors 102 may support one or more privilege levels or rings in each of the supported operating modes. In general, the operating modes and privilege levels of a processor 102 define the instructions available for execution and the effect of executing such instructions. More specifically, a processor 102 may be permitted to execute certain privileged instructions only if the processor 102 is in an appropriate mode and/or privilege level.

The firmware 112 may comprises Basic Input/Output System routines (BIOS). The BIOS may provide low-level routines that the processors 102 may execute during system start-up to initialize components of the computing device 100 and to initiate execution of an operating system. The token 110 may comprise one or more cryptographic keys and one or more platform configuration registers (PCR registers) to record and report metrics. The token 110 may support a PCR quote operation that returns a quote or contents of an identified PCR register. The token 110 may also support a PCR extend operation that records a received metric in an identified PCR register. In one embodiment, the token 110 may comprise a Trusted Platform Module (TPM) as described in detail in the Trusted Computing Platform Alliance (TCPA) Main Specification, Version 1.1a, 1 Dec. 2001 or a variant thereof.

The chipset 104 may comprise one or more chips or integrated circuits packages that interface the processors 102 to components of the computing device 100 such as, for example, system memory 108, the token 110, and the other I/O devices 114 of the computing device 100. In one embodiment, the chipset 104 comprises a memory controller 116. However, in other embodiments, the processors 102 may comprise all or a portion of the memory controller 116. The memory controller 116 may provide an interface for other components of the computing device 100 to access the system memory 108. Further, the memory controller 116 of the chipset 104 and/or processors 102 may define certain regions of the memory 108 as security enhanced (SE) memory 118.

In one embodiment, the processors 102 may only access SE memory 118 when in an appropriate operating mode (e.g. protected mode) and privilege level (e.g. 0P). Moreover, the SE memory 118 may comprise a trusted system clock 120 to maintain a system time. The trusted system clock 120 may comprise an interrupt service routine that is executed by the processors 102 in response to a system timer interrupt. The interrupt service routine may increment the system time of the trusted system clock 120 based upon the rate at which the system timer interrupts are generated. For example, if the system timer interrupts are generated at a rate of one system timer interrupt per a millisecond, the interrupt service routine may increment the system time of the trusted system clock 120 by one millisecond for each generated system timer interrupt. The computing device 100 may use the system time of the trusted system clock 120 to time-stamp files, to generate periodic interrupts, to generate time-based one-shot interrupts, to schedule processes, etc. Further, the computing device may use the trusted system clock to enforce policies for time-sensitive data. In particular, the computing device may enforce time-based access restrictions to data. For example, the computing device may prevent reading an email message after a period of time (e.g. a month) has elapsed from transmission. The computing device may also prevent reading of source code maintained in escrow until a particular date has arrived. As yet another example, the computing device may prevent assigning a date and/or time to a financial transaction that is earlier than the current date and/or time. However, for these time-based access restrictions to be effective, the computing device must trust the trusted system clock is resistant to attacks that may alter its system time to the advantage of an attacker.

The chipset 104 may also support standard I/O operations on I/O buses such as peripheral component interconnect (PCI), accelerated graphics port (AGP), universal serial bus (USB), low pin count (LPC) bus, or any other kind of I/O bus (not shown). A token interface 122 may be used to connect chipset 104 with a token 110 that comprises one or more platform configuration registers (PCR). In one embodiment, token interface 122 may be an LPC bus (Low Pin Count (LPC) Interface Specification, Intel Corporation, rev. 1.0, 29 Dec. 1997).

The chipset 104 may further comprise a real time clock (RTC) 124 to keep a wall time comprising, for example, seconds, minutes, hours, day of the week, day of the month, month, and year. The RTC 124 may further receive power from a battery 126 so that the RTC 124 may keep the wall time even when the computing device 100 is in a powered-down state (e.g. powered off, sleep state, etc.). The RTC 124 may further update its wall time once every second based upon an oscillating signal provided by an external oscillator 128. For example, the oscillator 128 may provide an oscillating signal having a frequency of 32.768 kilo-Hertz, and the RTC 124 may divide this oscillating signal to obtain an update signal having frequency of 1 Hertz which is used to update the wall time of the RTC 124.

The chipset 104 may further comprise a system timer 130 to generate the system timer interrupt used to drive the trusted system clock 120 at a programmable rate. To this end, the system timer 130 may comprise an Intel 8254 event timer, an Intel High Performance Event Timer (HPET), or a real time clock event timer that may be programmed to generate the system timer interrupt at a particular rate. In one embodiment, the system timer 130 may comprise a counter that may be programmed with a count value, and the system timer 130 may update (e.g. decrement by two) the count value for each cycle of an oscillating signal provided by an oscillator 132. Further, the system timer 130 may toggle a system timer interrupt (e.g. IRQ0) between an activated state and a deactivated state each time the count value has a predetermined relationship (e.g. equal) to a predetermined value (e.g. 0). The system timer 130 may further reload the count value after toggling the system timer interrupt. Accordingly, the system timer 130 may generate a periodic system timer interrupt having a rate or frequency that is defined by the count value and the frequency of the oscillator 132. The system timer 130 may further comprise an interface 134 to program the rate of the system timer interrupt and to obtain the rate of the system timer interrupt. In one embodiment, the interface 134 may comprise one or more registers which the processors 102 may read from in order to obtain the count value and therefore the rate of the system timer interrupt and which the processors 102 may write a count value in order to set the rate of the system timer interrupt. In another embodiment, the processors 102 may provide the interface 134 with commands or messages via the processor bus 106 to obtain the rate of the system timer interrupt and/or to program the rate of the system timer interrupt.

The chipset 104 may also comprise a system timer lock 136. The system timer lock 136 when activated may prevent the rate of the system timer 130 from being altered. For example, the system timer lock 136 may prevent writes, commands, and/or messages that may alter the rate from reaching the interface 134 or may cause the interface 134 to ignore such writes, commands, and/or messages. The lock 136 may be located in a security enhanced (SE) space (not shown) of the chipset 104. In one embodiment, the processors 102 may only alter contents of the SE space by executing one or more privileged instructions. An SE environment, therefore, may prevent processors 102 from altering the contents of the lock 136 via untrusted code by assigning execution of untrusted code to processor rings that are unable to successfully execute such privileged instructions.

The status store 138 may comprise one or more bits that may be used to store an indication of whether a possible system clock attack has been detected. For example, the status store 138 may comprise a single bit that may be activated to indicate that a possible system clock attack has been detected, and that may be deactivated to indicate that a possible system clock attack has not been detected. In another embodiment, the status store 138 may comprise a counter comprising a plurality of bits (e.g. 32 bits) to store a count. A change in the count value may be used to indicate a possible system clock attack. In yet another embodiment, the status store 138 may comprise a plurality of bits or counters that may be used to not only identify that a possible system clock attack was detected but may also indicate the type of system clock attack that was detected. The status store 138 may be further located in the SE space of the chipset 104 to prevent untrusted code from altering the contents of the status store 138.

The detector 140 of the chipset 104 may detect one or more ways an attacker may launch an attack against the trusted system clock 120 and may report whether a possible system clock attack has occurred. One way an attacker may attack the trusted system clock 120 is to alter via the interface 134 the rate at which the system timer 130 generates system timer interrupts. Even though one embodiment comprises a lock 136 to prevent untrusted code from changing the rate of the system timer 130, the detector 140 may still detect attempts to alter the rate via the interface 134. For example, in response to detecting that data was written to registers of the system timer interface 134 that are used to program the rate of the system timer 130, the detector 140 may update the status store 138 to indicate that a possible system clock attack has occurred. Similarly, the detector 140 may update the status store 138 to indicate a possible system clock attack in response to detecting that the interface 134 has received one or more commands or messages that may cause the system timer 130 to alter its rate of issuing system timer interrupts. In yet another embodiment, the detector 140 may determine that such accesses to the interface 134 are not system clock attacks if the lock 136 is deactivated, thus leaving the interface 134 unlocked.

Another way an attacker may attack the trusted system clock 120 is to increase or decrease the frequency of the oscillating signal of the oscillator 132 or to remove the oscillating signal from the system timer 130. An attacker may increase the frequency of the oscillating signal to make the trusted system clock 120 run fast and to indicate a system time that is ahead of the correct wall time. Similarly, an attacker may decrease the frequency of the oscillating signal to make the system clock 120 run slow and to indicate a system time that is behind the correct wall time. Further, an attacker may remove the oscillating signal or decrease the oscillating signal to zero HZ to stop the system clock 120 from updating its system time. In one embodiment, the detector 140 may update the status store 138 to indicate a possible system clock attack in response to detecting that the oscillating signal of the oscillator 132 is not present. In another embodiment, the detector 140 may update the status store 138 to indicate a possible system clock attack in response to detecting that the frequency of the oscillating signal has a predetermined relationship to a predetermined range (e.g. less than a value, greater than a value, and/or not between two values). To this end, the detector 140 may comprise a free running oscillator which provides a reference oscillating signal from which the detector 140 may determine whether the frequency of the oscillating signal provided by the oscillator 132 has the predetermined relationship to the predetermined range.

Figure 2:
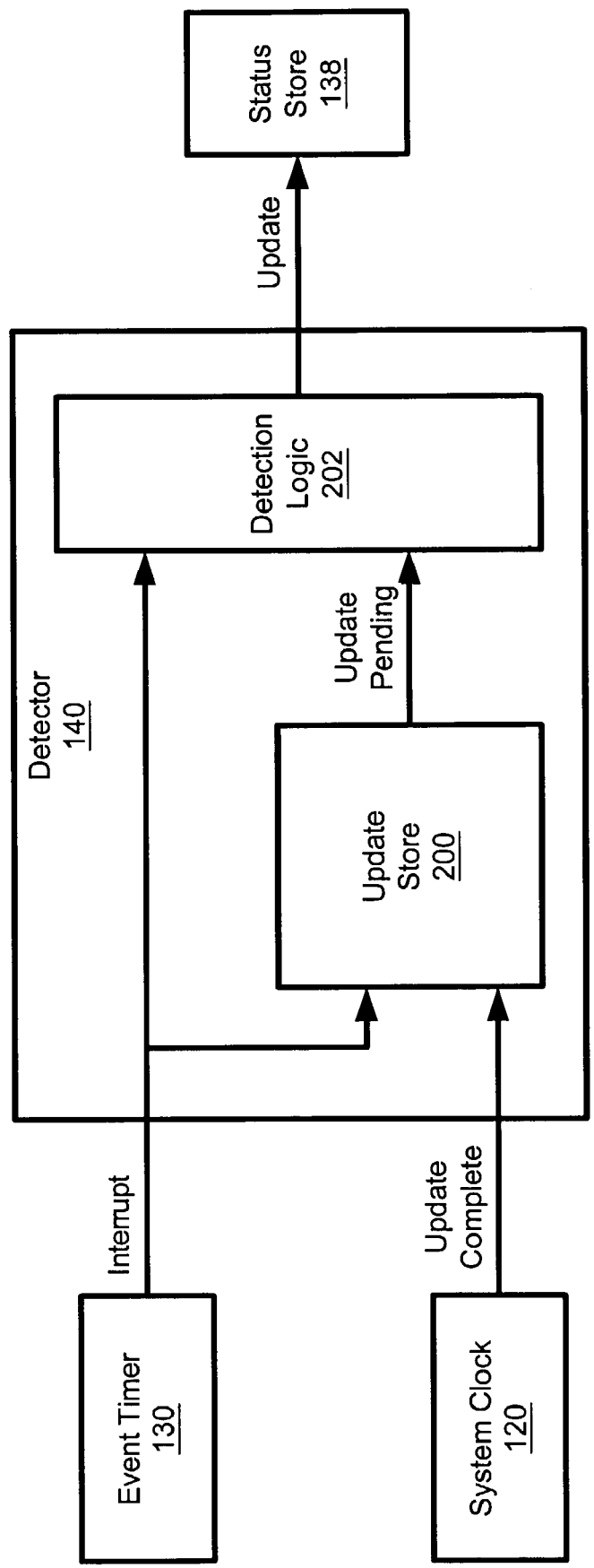
FIG. 2 illustrates an embodiment of a detector of the computing device of FIG. 1 that detects possible attacks against a system clock.

Yet another way an attacker may attack the trusted system clock 120 is to prevent the processors 102 from updating the system time of the trusted system clock 120 in response to each system timer interrupt, thus effectively making the trusted system clock 120 run slow or stop. To this end, the detector 140 may comprise logic that detects whether the trusted system clock 120 is updated in response to each system timer interrupt. An embodiment of such logic is shown in FIG. 2. As illustrated, the detector 140 may comprise an update store 200 to indicate whether an update of the trusted system clock 120 is pending. Moreover, the update store 200 may be located in SE space of the chipset 104 to permit trusted code to change the state of the update store 200 and to prevent untrusted code from changing the state of the update store 200. The detector 140 may further comprise detection logic 202 to detect a possible system clock attack based upon the update store 200 and generated system timer interrupts.

In one embodiment, the update store 200 may comprise a single bit that may be activated to indicate that a update is pending and that may be deactivated to indicate that no update is pending. The detector 140 may activate the update store 200 in response to each generated system timer interrupt to indicate that an update of the trusted system clock 120 is pending. Further, an interrupt service routine of the trusted system clock 120 may deactivate the update store 200 after updating the system time of the trusted system clock 120 to indicate that the update is complete. The detection logic 202 may then determine that a possible system clock attack has occurred in response to a system timer interrupt being issued while the update store 200 indicates that an update is still pending.

In another embodiment, the update store 200 may comprise a counter having a count value that indicates the number of system timer interrupts that have been generated since the last update of the system clock 120. The detector 140 may increment the counter of the update store 200 in response to each generated system timer interrupt to indicate the number of pending system clock updates. Further, an interrupt service routine of the trusted system clock 120 may obtain the count value from the update store 200 in response to a system timer interrupt, and may update the system time of the trusted system clock 120 based upon the obtained count value. After updating the trusted system clock 120, the interrupt service routine may further update the count value accordingly. For example, the interrupt service routine may decrement the counter by the number of system timer interrupts that were serviced by the update of the trusted system clock 120. The detection logic 202 may then determine that a possible system clock attack has occurred in response a system timer interrupt being issued while the count value of the update store 200 has a predetermined relationship (e.g. exceeds) a predetermined number (e.g. 5) of pending system clock updates.

An embodiment of an SE environment 300 is shown in FIG. 3. The SE environment 300 may be initiated in response to various events such as, for example, system start-up, an application request, an operating system request, etc. As shown, the SE environment 300 may comprise a trusted virtual machine kernel or monitor 302, one or more standard virtual machines (standard VMs) 304, and one or more trusted virtual machines (trusted VMs) 306. In one embodiment, the monitor 302 of the operating environment 300 executes in the protected mode at the most privileged processor ring (e.g. 0P) to manage security and provide barriers between the virtual machines 304, 306.

The standard VM 304 may comprise an operating system 308 that executes at the most privileged processor ring of the VMX mode (e.g. 0D), and one or more applications 310 that execute at a lower privileged processor ring of the VMX mode (e.g. 3D). Since the processor ring in which the monitor 302 executes is more privileged than the processor ring in which the operating system 308 executes, the operating system 308 does not have unfettered control of the computing device 100 but instead is subject to the control and restraints of the monitor 302. In particular, the monitor 302 may prevent untrusted code such as, the operating system 308 and the applications 310 from directly accessing the SE memory 118 and the token 110. Further, the monitor 302 may prevent untrusted code from directly altering the rate of the system timer 130, and may also prevent untrusted code from altering the status store 138 and the update store 200.

The monitor 302 may perform one or more measurements of the trusted kernel 312 such as a cryptographic hash (e.g. Message Digest 5 (MD5), Secure Hash Algorithm 1 (SHA-1), etc.) of the kernel code to obtain one or more metrics, may cause the token 110 to extend a PCR register with the metrics of the kernel 312, and may record the metrics in an associated PCR log-stored in SE memory 118. Further, the monitor 302 may establish the trusted VM 306 in SE memory 118 and launch the trusted kernel 312 in the established trusted VM 306.

Similarly, the trusted kernel 312 may take one or more measurements of an applet or application 314 such as a cryptographic hash of the applet code to obtain one or more metrics. The trusted kernel 312 via the monitor 302 may then cause the token 110 to extend a PCR register with the metrics of the applet 314. The trusted kernel 312 may further record the metrics in an associated PCR log stored in SE memory 118. Further, the trusted kernel 312 may launch the trusted applet 314 in the established trusted VM 306 of the SE memory 118.

The trusted kernel 312 may further comprise a trusted system clock 120. As indicated above, the trusted system clock 120 may comprise an interrupt service routine which is executed by the processors 102 in response to a system timer interrupt. The trusted system clock 120 may increment its system time by an amount that is based upon the rate at which the system timer 130 periodically generates the system timer interrupt. It should be appreciated that the trusted system clock 120 may be located in another trusted module of the SE environment 300. For example, the monitor 302 may include the trusted system clock 120. In another embodiment, the trusted system clock 120 may comprise a system clock nub 316 located in the monitor 302. The processors 102 may execute the system clock nub 316 in response to the system timer interrupts. Further, the system clock nub 316 may generate one or more interrupts, signals, and/or messages which cause the processors 102 to execute code of the trusted kernel 312 that updates the system time of the trusted system clock 120. The one or more interrupts, signals, and/or messages of system clock nub 316 may further cause the processors 102 to executed code of the operating system 308 that updates an untrusted system clock 318 of the untrusted operating system 308.

In response to initiating the SE environment 300 of FIG. 3, the computing device 100 may further record metrics of the monitor 302 and hardware components of the computing device 100 in a PCR register of the token 110. For example, the processor 102 may obtain hardware identifiers such as, for example, processor family, processor version, processor microcode version, chipset version, and token version of the processors 102, chipset 104, and token 110. The processor 102 may then record the obtained hardware identifiers in one or more PCR register.

Figure 4:
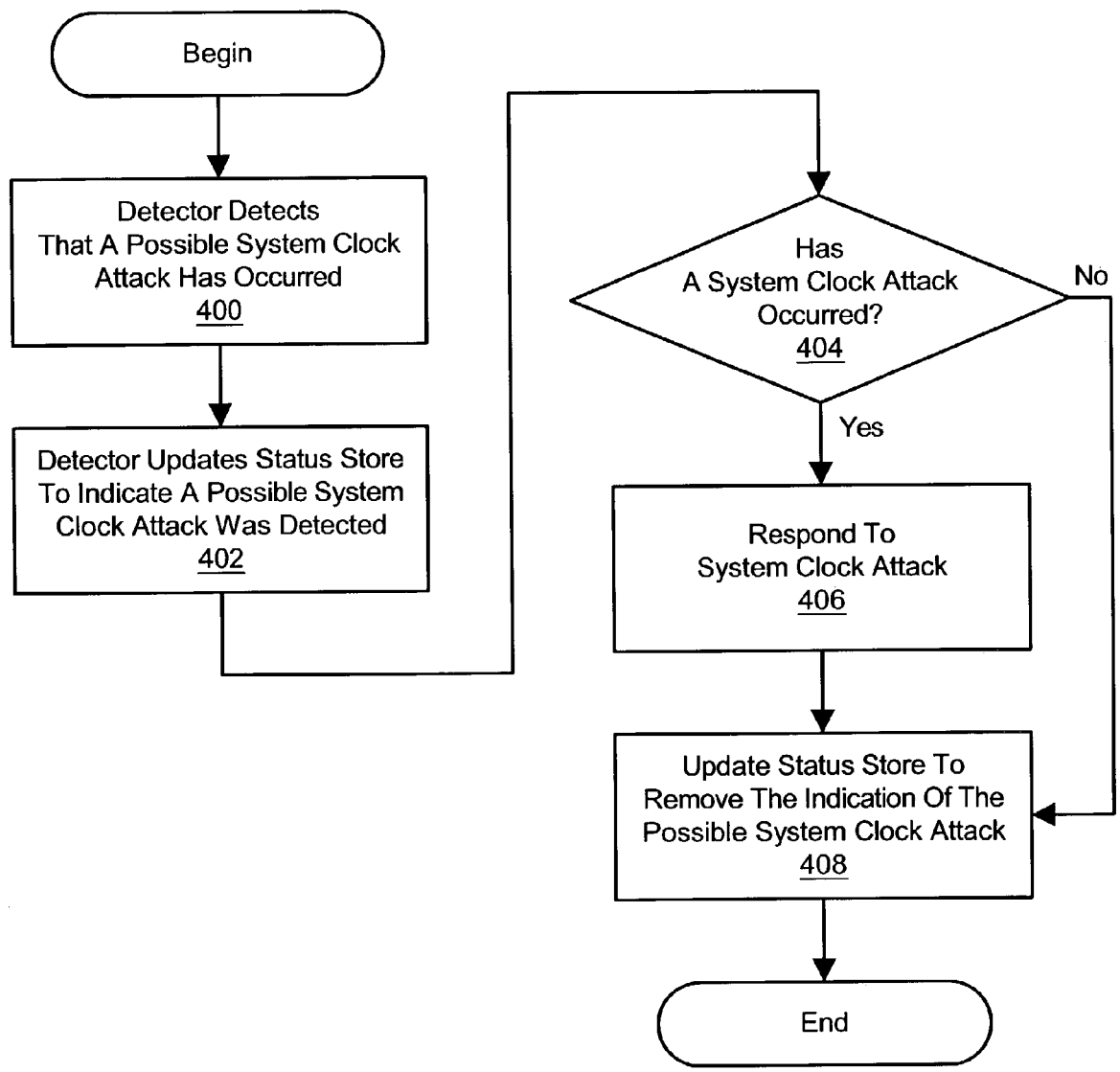
FIG. 4 illustrates an example embodiment of a method for responding to a possible attack of the system clock.

A example method of responding to a possible attack against the trusted system clock 120 is shown in FIG. 4. In block 400, the detector 140: may detect that a possible system clock attack has occurred. For example, the detector 140 may determine that a possible system clock attack has occurred in response to determining that the frequency of the oscillator 132 has a predetermined relationship to a predetermined range, that the system timer interface 134 has been accessed in a manner that may have changed the rate at which the system timer 130 issues system timer interrupts, and/or that the number of pending updates to the trusted system clock 120 has a predetermined relationship to a predetermined number of pending updates. The detector 140 in block 402 may update the status store 138 to indicate a possible system clock attack. In one embodiment, the detector 140 may indicate a possible system clock attack by activating a bit of the status store 138. In another embodiment, the detector 140 may indicate a possible system clock attack by updating (e.g. incrementing, decrementing, setting, resetting) a count value of the status store 138.

The monitor 302 in block 404 may determine whether a system clock attack has occurred based upon the status store 138. In one embodiment, the monitor 302 may determine that a system clock attack has occurred in response to a bit of the status store 138 being active. In another embodiment, the monitor 302 may determine that a system clock attack has occurred in response a count value of the status store 138 having a predetermined relationship (e.g. not equal) to an expected count value. For example, the monitor 302 may maintain an expected count value that is retained through system resets, system power downs, or SE environment tear downs. The monitor 302 may compare the count value of the status store 138 with the expected count value to determine whether the detector 140 has detected one or more possible system clock attacks since the monitor 302 last updated its expected count value.

In addition to the status store 138, the monitor 302 may also determine whether a system clock attack has occurred based upon a trust policy. The trust policy may permit certain types of adjustments or changes to the system time of the trusted system clock 120 that are otherwise flagged by the detector 140 as possible system clock attacks. For example, the status store 138 may indicate that the rate of the system timer 130 was changed via the interface 134. However, the trust policy may allow the processors 102 to increase or decrease the rate of the system timer 130 by no more than a predetermined amount without it being defined as a system clock attack. While the trust policy may allow the rate of the system timer 130 to be adjusted, the trust policy may define such an adjustment as a system clock attack if more than a predetermined number of adjustments (e.g. 1, 2) are made via the interface 134 during a predetermined interval (e.g. per day, per week, per system reset/power down).

In block 406, the monitor 302 may respond to the detected system clock attack. In one embodiment, the monitor 302 may respond based upon a trust policy. In one embodiment, the trust policy may indicate that the SE environment 300 does not contain time-sensitive data and/or is not performing time-sensitive operations. Accordingly, the monitor 302 may simply ignore the possible system clock attack. In another embodiment, the policy may indicate that the monitor 302 is to reset the computing device 100 or tear down the SE environment 300 in response to detecting certain types of system clock attacks such as, for example, detecting that the frequency of the oscillating signal has a predetermined relationship to a predetermined range or that the rate of the system timer 130 has a predetermined relationship to a predetermined range. In another embodiment, the monitor 302 may provide an interested party an opportunity to verify and/or change the system time of the trusted system clock 120. For example, the monitor 302 may provide a user of the computer device 100 and/or the owner of the time-sensitive data with the system time of the trusted system clock 120 and may ask the user and/or owner to verify that the system time is correct and/or to update the system time to the correct wall time.

The monitor 302 in block 408 may update the status store 138 to remove the indication of a possible system status attack. In one embodiment, the monitor 302 may deactivate a bit of the status store 138 in order to clear the indication of a possible RTC attack. In another embodiment, the monitor 302 may update its expected count value and/or a count value of the status store 138 such that the expected count value and the count value of the status store 138 have a relationship that indicates that no system clock attack has been detected.

The computing device 100 may perform all or a subset of the example method of FIG. 4 in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while the example method of FIG. 4 is illustrated as a sequence of operations, the computing device 100 in some embodiments may perform various illustrated operations of the method in parallel or in a different order.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. For use with a system clock that keeps a system time, a method comprising
storing an indication that an update of the system time is pending,
detecting a possible attack against the system clock based upon receiving a system timer interrupt while the stored indication indicates that the update of the system time remains pending, and
updating a status store to indicate a possible attack against the system clock.

2. The method of claim 1 further comprising detecting a possible attack against the system clock in response to determining that the system clock is being updated at an inappropriate rate.

3. The method claim 1 further comprising
updating the system time in response to system timer interrupts, and
detecting a possible attack against the system clock in response to detecting an attempt to change a rate at which the system timer interrupts are generated.

4. The method of claim 1 further comprising
updating the system time in response to system timer interrupts, and
detecting a possible attack against the system clock in response to detecting one or more accesses to an interface of the system timer that may alter a rate at which the system timer issues the system timer interrupts.

5. The method of claim 1 further comprising
updating the system time in response to system timer interrupts issued by a system timer, and
detecting a possible attack against the system clock in response to detecting a frequency of an oscillator associated with the system timer has a predetermined relationship to a predetermined range.

6. The method of claim 1 further comprising
activating a bit of the status store in response to detecting a possible attack against the system clock, and
preventing untrusted software from deactivating the bit of the status store.

7. The method of claim 1 further comprising
updating a count of a counter of the status store in response to detecting a possible attack against the system clock, and
preventing untrusted software from altering the count of the counter.

8. The method of claim 1 further comprising
updating the system time in response to system timer interrupts issued by a system timer, and
determining that a possible attack has not occurred in response to determining that an adjustment to a rate at which the system timer issues the system timer interrupts has a predetermined relationship to a predetermined range.

9. The method of claim 1 further comprising
updating the system time in response to system timer interrupts issued by a system timer, and
determining that a possible attack has occurred in response to determining that more than a predetermined number of adjustments have been made to a rate at which the system timer issues the system timer interrupts.

10. A chipset comprising
a status store to indicate whether a possible attack against a system clock was detected,
a detector to detect a possible attack against the system clock and to update the status store based upon whether a possible attack against the system clock was detected, and
an update store to store an indication that indicates whether an update to the system clock is pending, wherein the detector detects a possible attack against the system clock based upon the stored indication of the update store indicating an update to the system clock is pending upon receipt of system timer interrupts used to update the system clock.

11. The chipset of claim 10 further comprising a system timer to generate an interrupt, wherein the detector detects a possible attack against the system clock in response to determining that the system clock is being updated at an inappropriate rate.

12. The chipset of claim 11 further comprising a system timer lock that in response to being activated prevents a rate at which the system timer generates interrupts from being altered.

13. The chipset of claim 12 wherein the system timer lock is located in a security enhanced space that prevents untrusted code from altering state of the system timer lock.

14. The chipset of claim 10 wherein the update store is located in a security enhanced space that prevents untrusted code from updating the update store.

15. The chipset of claim 10 wherein
the status store comprises a bit that untrusted code is prevented from deactivating and trusted code of a security enhanced environment is permitted to deactivate, and
the detector activates the bit of the status store in response to detecting a possible attack against the system clock.

16. The chipset of claim 10 wherein
the status store comprises a counter that untrusted code is prevented from updating and that trusted code of a security enhanced environment is permitted to deactivate, and
the detector updates a count of the counter in response to detecting a possible attack against the system clock.

17. A computing device comprising
memory to store an interrupt service routine for system timer interrupts,
a system timer to generate system timer interrupts that invoke execution of the interrupt service routine,
a processor to update a system time of a system clock in response to executing the interrupt service routine,
an update store to store an indication that indicates whether an update to the system clock is pending, and
a detector to detect a possible attack against the system clock based upon the stored indication of the update store indicating an update to the system clock is pending upon receipt of system timer interrupts.

18. The computing device of claim 17 further comprising a status store to indicate whether a possible attack against the system clock was detected, wherein
the detector updates the status store to indicate a possible attack against the system clock.

19. The computing device of claim 17 further comprising a bit to indicate whether a possible attack against the system clock was detected, wherein
the detector activates the bit to indicate a possible attack against the system clock.

20. The computing device of claim 19 wherein the bit is located in a security enhanced space that prevents untrusted code from altering contents of the bit.

21. The computing device of claim 17 further comprising an external oscillator to provide the system timer with an oscillating signal, wherein
the system timer generates the system timer interrupts at a first rate that is based upon a frequency of the oscillating signal, and
the detector detects a possible attack against the system clock in response to determining that the frequency of the oscillating signal has a predetermined relationship to a predetermined range.

22. The computing device of claim 17 further comprising a system timer lock that in response to being activated prevents a rate at which the system timer generates system timer interrupts from being altered.

23. The computing device of claim 22 wherein the system timer lock is located in a security enhanced space that prevents untrusted code from altering state of the system timer lock.

24. The computing device of claim 17 wherein the interrupt service routine comprises a system clock nub that invokes updates of one or more system time clocks.

25. A machine-readable medium comprising a plurality of instructions that in response to being executed result in a computing device
updating a system time of a system clock and an update store used to indicate a pending update of the system clock in response to handling a system timer interrupt,
determining that an attack against the system clock of the computing device has been detected based upon a count value of the update store that is indicative of a number generated system timer interrupts since a previous update of the system time of the system clock, and
responding to the attack against the system clock.

26. The machine-readable medium of claim 25 wherein the plurality of instructions further result in the computing device responding to the attack by requesting an interested party to confirm that a system time of the system clock is correct.

27. The machine-readable medium of claim 25 wherein the plurality of instructions further result in the computing device responding to the attack by preventing access to time-sensitive data.

28. The machine-readable medium of claim 25 wherein the plurality of instructions further result in the computing device responding to the attack by preventing time-sensitive operations.

29. The machine-readable medium of claim 25 wherein the plurality of instructions further result in the computing device determining that an attack has been detected based upon whether a bit of a status store has been activated.

30. The machine-readable medium of claim 25 wherein the plurality of instructions further result in the computing device determining that an attack has been detected based upon whether a counter of a status store has an expected count value.

31. The machine-readable medium of claim 25 wherein the plurality of instructions further result in the computing device determining that an attack has been detected based upon a status store and a trust policy.

32. The machine-readable medium of claim 25 wherein the plurality of instructions further result in the computing device determining that an attack has been detected in response to determining that more than a predetermined number of adjustments have been made to a rate of a system timer used to drive the system clock.

33. An apparatus comprising
an update store to store an indication that indicates whether an update to a system clock is pending, and
detection logic to detect a possible attack against the system clock based upon the stored indication of the update store and one or more system timer interrupts used to invoke an update of the system clock, wherein the detection logic determines that a possible attack against the system clock has occurred if a system timer interrupt is received while the update store indicates an update to the system clock is pending.

34. The apparatus of claim 33 wherein the update store comprises a bit that may be activated to indicate an update is pending and that may be deactivated to indicate that no update is pending, and the detection logic determines that a possible attack against the system clock has occurred if a system timer interrupt is received while the bit of the update store is active.

35. The apparatus of claim 34 wherein the update store is located in a security enhanced space that prevents untrusted code from altering contents of the update store and that permits trusted code to alter contents of the update store.

36. The apparatus of claim 33 wherein the update store comprises a count value indicative of a number of updates that are pending, and the detection logic determines that a possible attack against the system clock has occurred if the count value has a predetermined relationship to a predetermined value.

37. The apparatus of claim 36 wherein the update store is located in a security enhanced space that prevents untrusted code from altering contents of the update store and that permits trusted code to alter contents of the update store.

* * * * *